(12) United States Patent
Niangar et al.

(10) Patent No.: US 9,504,999 B2
(45) Date of Patent: *Nov. 29, 2016

(54) RAPID SYNTHESIS OF FUEL CELL CATALYST USING CONTROLLED MICROWAVE HEATING

(71) Applicant: Nissan North America, Inc., Franklin, TN (US)

(72) Inventors: Ellazar V. Niangar, Farmington Hills, MI (US); Taehee Han, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 509 days.

This patent is subject to a terminal disclaimer.

(21) Appl. No.: 14/027,502

(22) Filed: Sep. 16, 2013

(65) Prior Publication Data

US 2014/0011665 A1 Jan. 9, 2014

Related U.S. Application Data

(63) Continuation of application No. 13/537,842, filed on Jun. 29, 2012, now Pat. No. 8,563,463.

(51) Int. Cl.
*B01J 23/00* (2006.01)
*B01J 37/34* (2006.01)
*H01M 4/92* (2006.01)

(52) U.S. Cl.
CPC ............ *B01J 37/346* (2013.01); *H01M 4/923* (2013.01); *H01M 4/926* (2013.01); *H01M 4/921* (2013.01); *Y02E 60/50* (2013.01)

(58) Field of Classification Search
CPC .... B01J 37/346; H01M 4/923; H01M 4/926; H01M 4/921; Y02E 60/50
See application file for complete search history.

(56) References Cited

U.S. PATENT DOCUMENTS

| 3,460,995 A | 8/1969 | Krause |
| 6,232,264 B1 | 5/2001 | Lukehart et al. |

(Continued)

FOREIGN PATENT DOCUMENTS

JP 2003013105 A 1/2003

OTHER PUBLICATIONS

Chen, Wei Xiang; Lee, Jim Yang; Liu, Zhaolin, "Microwave-assisted synthesis of carbon supported Pt nanoparticles for fuel cell applications", Chemical Communications (2002).

(Continued)

*Primary Examiner* — Colleen Dunn
*Assistant Examiner* — Haytham Soliman
(74) *Attorney, Agent, or Firm* — Young Basile Hanlon & MacFarlane, P.C.

(57) ABSTRACT

Methods for the rapid synthesis of catalyst are provided, as well as catalyst formed from such methods. One method of the rapid synthesis of catalyst comprises forming a homogenous solution comprising a precious metal precursor and a catalyst substrate, reducing the precious metal precursor to precious metal nanoparticles, and depositing the precious metal nanoparticles onto the catalyst substrate to form catalyst particles. The reducing and depositing steps comprise controlling a rate of increase in temperature of the solution with microwave irradiation until the solution is a predetermined temperature and maintaining the solution at the predetermined temperature with microwave irradiation. The method further comprises detecting completion of the reduction and deposition and ceasing microwave irradiation upon detection.

18 Claims, 7 Drawing Sheets

(56) References Cited

U.S. PATENT DOCUMENTS

| | | |
|---|---|---|
| 6,596,130 B2 | 7/2003 | Westman |
| 6,746,510 B2 | 6/2004 | Kurihara et al. |
| 6,776,031 B2 | 8/2004 | Nakamura |
| 7,615,169 B2 | 11/2009 | Strouse et al. |
| 2002/0136896 A1 | 9/2002 | Takikawa et al. |
| 2004/0127621 A1 | 7/2004 | Drzal et al. |
| 2007/0075052 A1 | 4/2007 | Fanson et al. |
| 2007/0101824 A1 | 5/2007 | Drzal et al. |
| 2008/0175765 A1 | 7/2008 | Cao et al. |
| 2009/0304923 A1 | 12/2009 | Mitra et al. |
| 2010/0032849 A1 | 2/2010 | Viswanathan |
| 2010/0035775 A1 | 2/2010 | Viswanathan |
| 2010/0222211 A1 | 9/2010 | Drzal et al. |

OTHER PUBLICATIONS

Bock et al., "Size-Selected Synthesis of PtRu Nano-Catalysts: Reaction and Size Control Mechanism", Jun. 3, 2004, J. American Chemical Society, 126 (25), pp. 8028-8037.

Chun-Ching et al., "Effective preparation of carbon nanotube-supported Pt-Ru electrocatalysts", Sep. 10, 2006, Materials Chemistry and Physics, vol. 99, Issue 1, pp. 80-87.

Dalmia et al., "Synthesis of Ion Conducting Polymer Protected Nanometer Size Platinum Colloids", Sep. 15, 1998, Journal of Colloid and Interface Science, vol. 205, Issue 2, pp. 535-537.

US 9,504,999 B2

RAPID SYNTHESIS OF FUEL CELL CATALYST USING CONTROLLED MICROWAVE HEATING

CROSS REFERENCE TO RELATED APPLICATION

This application is a continuation of U.S. patent application Ser. No. 13/537,842 filed on Jun. 29, 2012 and incorporated herein in its entirety.

TECHNICAL FIELD

The disclosure relates in general to the synthesis of fuel cell catalyst, and in particular to the synthesis of fuel cell catalyst using controlled microwave heating.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using hydrogen as fuel and oxygen/air as oxidant. A typical proton exchange membrane fuel cell is generally composed of five layers that form a fuel cell membrane electrode assembly. The membrane electrode assembly includes a solid polymer electrolyte proton conducting membrane, two gas diffusion layers, and two catalyst layers.

Catalyst performance is directly tied to fuel cell performance. The electrochemical reactions in a fuel cell occur on the surface of active metal catalysts. Atoms in the surface of the catalyst interact with the fuel and oxidant gases, making and breaking chemical bonds. To optimize the rate of these reactions, fuel cell catalysts are synthesized with nanometer sizes to increase the surface area of the catalyst. However, traditional solution-based chemical techniques for the preparation of metal nanoparticles are typically time-consuming and labor intensive processes.

SUMMARY

Methods for the rapid synthesis of catalyst are disclosed herein. One method of the rapid synthesis of catalyst comprises first forming a solution that comprises a solvent, a precious metal precursor, a catalyst substrate, a reducing agent and a stabilizer. The solution is homogenized. The precious metal precursor is reduced to nanoparticles of the precious metal and the nanoparticles are deposited onto the catalyst substrate to form catalyst particles. Reducing and depositing comprise increasing a temperature of the solution with microwave irradiation at a controlled rate to a predetermined temperature and holding the solution at the predetermined temperature with microwave irradiation until the reduction and depositing are detected to be complete.

Another method of the rapid synthesis of catalyst comprises forming a homogenous solution comprising a precious metal precursor and a catalyst substrate, reducing the precious metal precursor to precious metal nanoparticles, and depositing the precious metal nanoparticles onto the catalyst substrate to form catalyst particles. The reducing and depositing steps comprise controlling a rate of increase in temperature of the solution with microwave irradiation until the solution is a predetermined temperature and maintaining the solution at the predetermined temperature with microwave irradiation. The method further comprises detecting completion of the reduction and deposition and ceasing microwave irradiation upon detection.

Also disclosed herein are catalyst formed with the rapid synthesis processed disclosed herein. One embodiment of a catalyst disclosed herein is an ultra-low loading catalyst prepared by a process comprising forming a solution, wherein the solution comprises a solvent, a precious metal precursor, a catalyst substrate, a reducing agent and a stabilizer. The solution is homogenized. The precious metal precursor is reduced to nanoparticles of the precious metal and the nanoparticles are deposited onto the catalyst substrate to form catalyst particles. Reducing and depositing comprise increasing a temperature of the solution with microwave irradiation at a controlled rate to a predetermined temperature and holding the solution at the predetermined temperature with microwave irradiation until the reduction and depositing are detected to be complete.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

Traditional methods of catalyst synthesis, particularly water-based methods, produce particles that have non-uniform and non-optimal particle sizes, poor dispersion on the catalyst support, and a high degree of agglomeration. Disclosed herein are processes involving the rapid synthesis of fuel cell catalysts using controlled microwave irradiation. Also disclosed are the ultra-low loading catalyst produced by these processes. These methods produce ultra-fine metal catalyst nanoparticles with a low degree of agglomeration and good dispersion on the support, both of which contribute to optimum catalytic activity.

Figure 1:
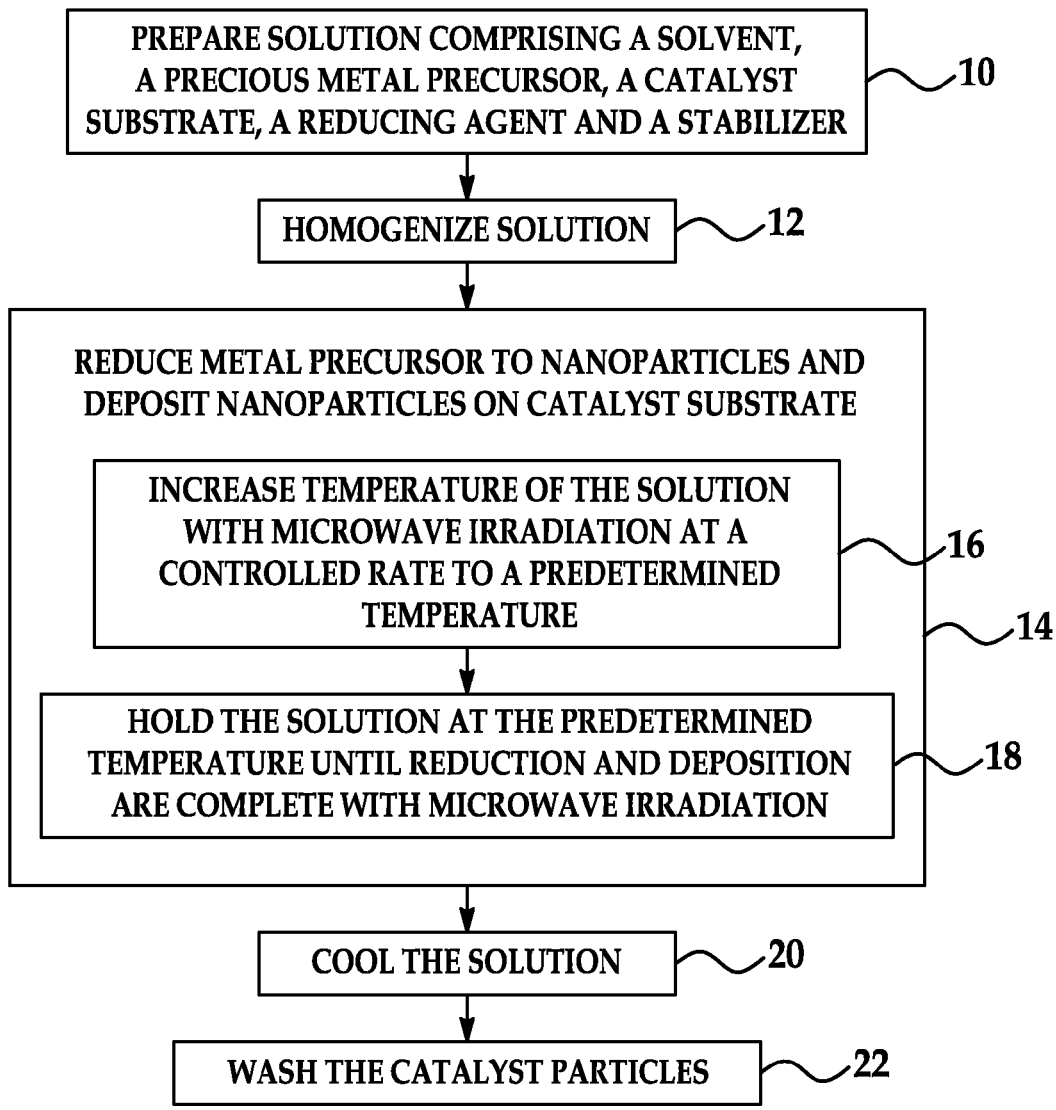
FIG. 1 is a flow diagram of a method of rapidly synthesizing a catalyst as disclosed herein.

FIG. 1 is a flow diagram illustrating an embodiment of the rapid synthesis of catalyst as disclosed herein. In step 10, a solution is prepared that comprises a solvent, a precious metal precursor, a catalyst substrate, a reducing agent and a stabilizer. The solution is homogenized in step 12. The precious metal precursor is reduced to nanoparticles of the precious metal and the nanoparticles are deposited onto the catalyst substrate to form catalyst particles in step 14. Reducing and depositing in step 14 can be completed by increasing a temperature of the mixture using microwave irradiation at a controlled rate to a predetermined temperature in step 16, and holding the mixture at the predetermined temperature using microwave irradiation until the reduction and depositing are detected to be complete in step 18.

As noted, the components used to prepare the solution in step 10 include a solvent, a precious metal precursor, a catalyst substrate, a reducing agent and a stabilizer. The catalyst substrate can be those catalyst substrates known to those skilled in the art and include, as non-limiting examples, various types of carbon blacks, such as Vulcan®, Ketjenblack®, Black Pearl™ and acetylene black. Other examples include raw carbon with no structured porosity or carbon precursors, carbon nanotubes, micro-pore controlled structured carbon types. The catalyst substrate can also be non-traditional, novel alternative supports such as oxygen reduction reaction-active carbon materials, conductive metal oxide particles, non-precious group metal catalysts and other materials that assist in oxygen reduction reactions.

The precious metal precursor can include one or a combination of precious metals such as platinum, gold, rhodium, ruthenium, palladium and iridium, and/or transition metals such as cobalt and nickel. The precious metal can be in various forms, such as alloys, nanowires, nanoparticles and coreshells, which are bimetallic catalysts that possess a base metal core surrounded by a precious metal shell. The precious metal precursor can include one or more metal co-catalysts, such as $PtSnO_2$, $PtSnO_2TiO_2$, $PtPdSnO_2$ and $PtNb_2O_s$.

The solvent can be, as non-limiting examples, water, alcohol, polyols, and polymeric polyols. If a polyol is used as the solvent, the polyol will also perform as the reducing agent, reducing the number of raw materials required. For example, polyols such as ethylene glycol, diethylene glycol, propylene glycol, glycerol and polyethylene glycol can be used as the solvent and reducing agent to carry out the reduction of metal precursors to metallic nanoparticles. Depending on the type of precious metal precursor added to the solution, an additional reducing agent may be required. For example, a precious metal precursor containing palladium may require an additional reducing agent if ethylene glycol is used as the solvent.

The stabilizer added to the solution can be a surfactant or any other substance known to those skilled in the art to protect the particles from agglomeration. If particular polyols are used as the solvent and reducing agent, it is possible a stabilizer will not be needed as the polyol will also perform as the stabilizer.

Figure 2A:
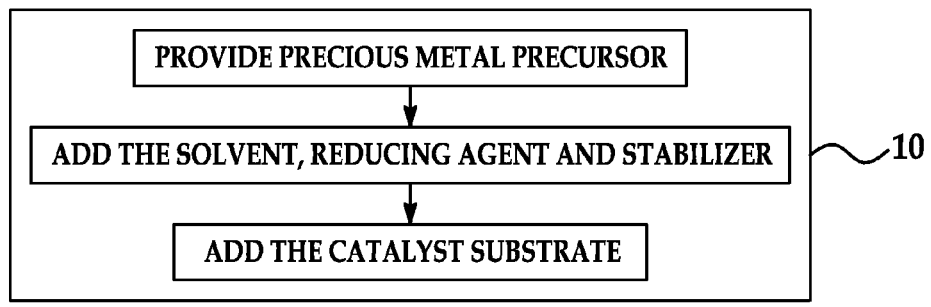
FIG. 2A is a flow diagram of a method of preparing a solution used in the processes disclosed herein.
Figure 2B:
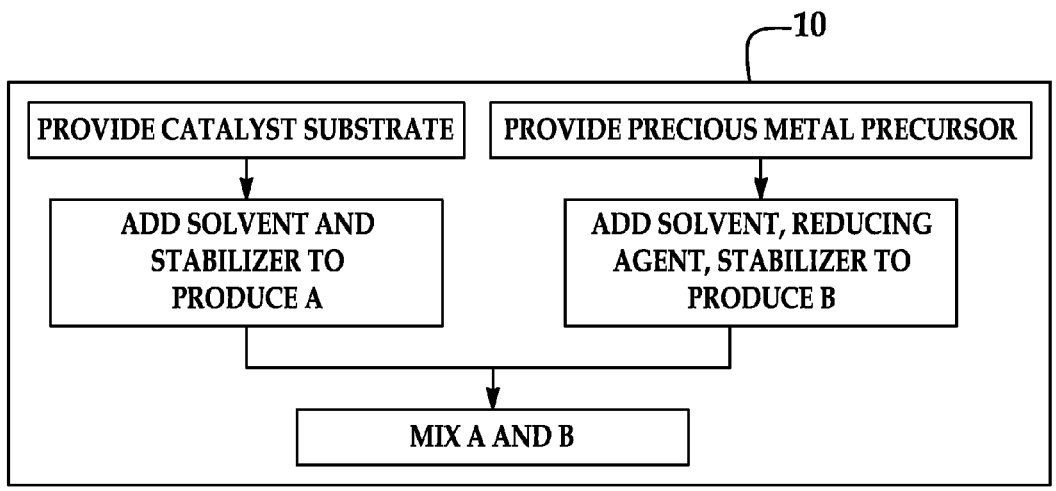
FIG. 2B is a flow diagram of another method of preparing a solution used in the processes disclosed herein.

In preparing the solution, the precious metal precursor, the solvent, the reducing agent and the stabilizer can be added in any order or contemporaneously. As a non-limiting example, the solution in step 10 can be prepared as illustrated in FIG. 2A, where the solvent, reducing agent and stabilizer can be added to the precious metal precursor in any order or contemporaneously. The catalyst substrate can then be added to complete the solution. Alternatively, as shown in FIG. 2B, the catalyst substrate can be added to the solvent and stabilizer to produce mixture A, and the precious metal precursor can be added to additional of the solvent and stabilizer, along with the reducing agent, to product mixture B. Mixtures A and B can be mixed together to form the solution. For example, the catalyst substrate can be mixed with ethylene glycol and the precious metal precursor can be mixed with ethylene glycol. Those two mixtures are then added together to form the solution. The ethylene glycol acts as the solvent, reducing agent and stabilizer.

Figure 2C:
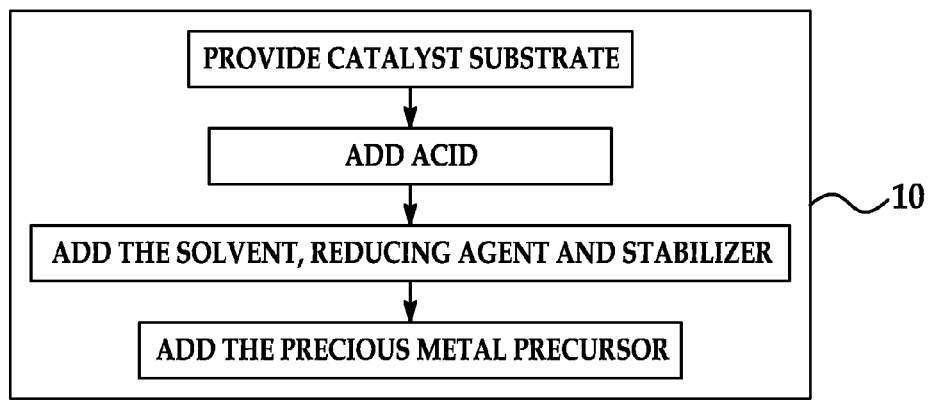
FIG. 2C is a flow diagram of yet another method of preparing a solution used in the processes disclosed herein.

In another aspect of the process, illustrated in FIG. 2C, an acid can be added to a the catalyst substrate, when the catalyst substrate comprises carbon, prior to adding the precious metal precursor to optimize deposition of the precious metal precursor on the catalyst substrate. The acid facilitates the formation of acidic functional groups, which are positively charged, on the carbon in the catalyst substrate prior to reducing. The acidic functional groups assist in positioning the precious metal in the precious metal precursor, which is negatively charged, as the precious metal precursor is reduced. Acids such as perchloric acid can be used. The solvent, reducing agent, stabilizer and precious metal substrate are added after the acid.

Figure 2D:
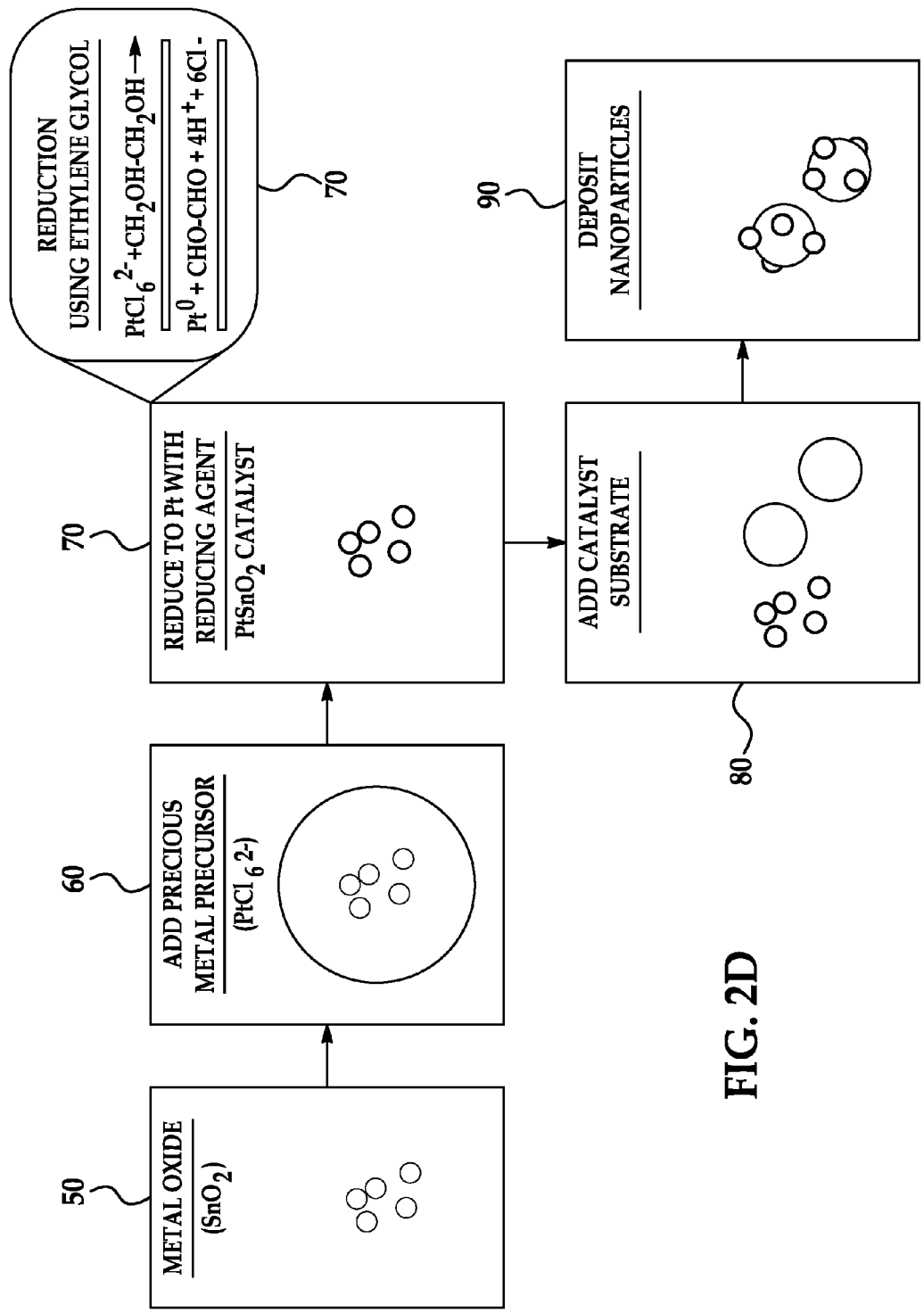
FIG. 2D is a schematic of yet another method of preparing a solution used in the processes disclosed herein.

FIG. 2D is a schematic diagram illustrating producing a solution for a multi-component catalyst. In FIG. 2D a metal oxide is provided in step 50, shown as tin dioxide ($SnO_2$) as a non-limiting example. A precious metal precursor, here $PtCl_6^2$ is added to the metal oxide in step 60, and ethylene glycol is added in step 70 as the solvent, reducing agent and stabilizer. The chemical reaction taking place in step 70 is shown in greater detail in the bubble. The precious metal precursor is reduced to $Pt^0$ and forms $PtSnO_2$ nanoparticles in step 70. Catalyst substrate is added to the mixture to complete the solution in step 80. The nanoparticles are deposited on the catalyst substrate in step 90.

Referring back to FIG. 1, in step 12, the solution is homogenized. To homogenize the solution, any means can be used known to those skilled in the art. Examples include sonication, mixing with a magnetic bar, and the like. The homogenization assists in dispersing the catalyst substrate and precious metal precursor, which results in a more uniform loading of the catalyst particles on the catalyst substrate.

In step 14, the precious metal precursor is reduced to nanoparticles of the precious metal and the nanoparticles are deposited onto the catalyst substrate to form catalyst particles. Step 14 is carried out in two parts, increasing the temperature of the solution using microwave irradiation at a controlled rate until the predetermined temperature is reached, in step 16, and holding the solution at the predetermined temperature using microwave irradiation until the reduction and depositing are detected to be complete in step 18. The reduction of the precious metal precursor to nanoparticles can occur in either or both of step 16 and 18. The deposition of the nanoparticles onto the catalyst substrate occurs after reduction has initiated, so it can occur in either or both of step 16 and 18 so long as reduction has been initiated.

During steps 16 and 18, the metal salts, oxides, and other complexes in the catalyst precursor are reduced by the reducing agent at elevated temperatures. For example, metal ions are reduced to their metallic elemental state by receiving electrons from the oxidation of the reducing agent. The stabilizer adsorbs on the metal nanoparticle surface and provides electrostatic repulsive forces between metal nanoparticles to prevent particle agglomeration. As a non-limiting example, ethylene glycol can be used as the solvent, reducing agent and stabilizer. The precious metal ions in the precious metal precursor, for example $PtCl_6^{2-}$, are reduced to their metallic elemental state $Pt^0$ by receiving electrons from the oxidation of ethylene glycol to glycolic acid. Glycolic acid becomes glycolate in alkaline or basic solutions. The glycolate anions adsorb on the metal nanoparticle surface and act as stabilizers by providing electrostatic repulsive forces between metal nanoparticles to prevent particle agglomeration.

In step 16, the temperature of the solution is increased from room temperature to a predetermined temperature of up to about 300° C., and in particular, about 180-200°C., using microwave irradiation. The temperature is increased at a controlled rate, with the rate selected from between about 8° C./minute to about 12° C./minute. The controlled rate prevents superheating of a portion or all of the solution and provides for more uniform reduction and deposition.

When the predetermined temperature is reached, the solution is held at the predetermined temperature using microwave irradiation until the reduction and depositing are detected to be complete in step 18.

The detection of the reduction and depositing being complete can be achieved by detecting when a predetermined period of time has elapsed. When the predetermined period of time has elapsed, the microwave irradiation will cease. Alternatively, visual detection of a color change of the solution can detect the completion of reduction and deposition. As non-limiting examples, the solution can begin as a nearly transparent solution with the completion of the reduction and deposition detected when the solution has turned opaque, and/or the solution can begin as a colored solution such as orange with the completion of the reduction and deposition detected when the solution has turned black. As an alternative or addition to visual detection, a light emitter and detector can be used to detect when the solution turns from transparent to opaque.

The microwave irradiation can be provided with a microwave oven or with directed microwave beams. An apparatus disclosed herein uses a microwave oven for more uniform heating.

Referring back to FIG. 1, the solution can be cooled to room temperature in step 20. Once cooled, the catalyst particles are washed in step 22 to remove impurities. For example, the catalyst particles may be washed a number of times with deionized water to remove chloride ions from the catalyst particles along with other impurities.

During step 14, reducing and depositing, additives may be added to the solution. For example, additional surfactants, stabilizers or dispersants can be added. Additional reducing agents may be added to the solution if a stronger reducing agent is required, such as $NaBH_4$. Additional metal precursors can also be added in the middle of the synthesis, such as additional transition metals and/or precious metals when the resulting catalyst particles are to be alloys or core-shell morphologies.

Figure 3:
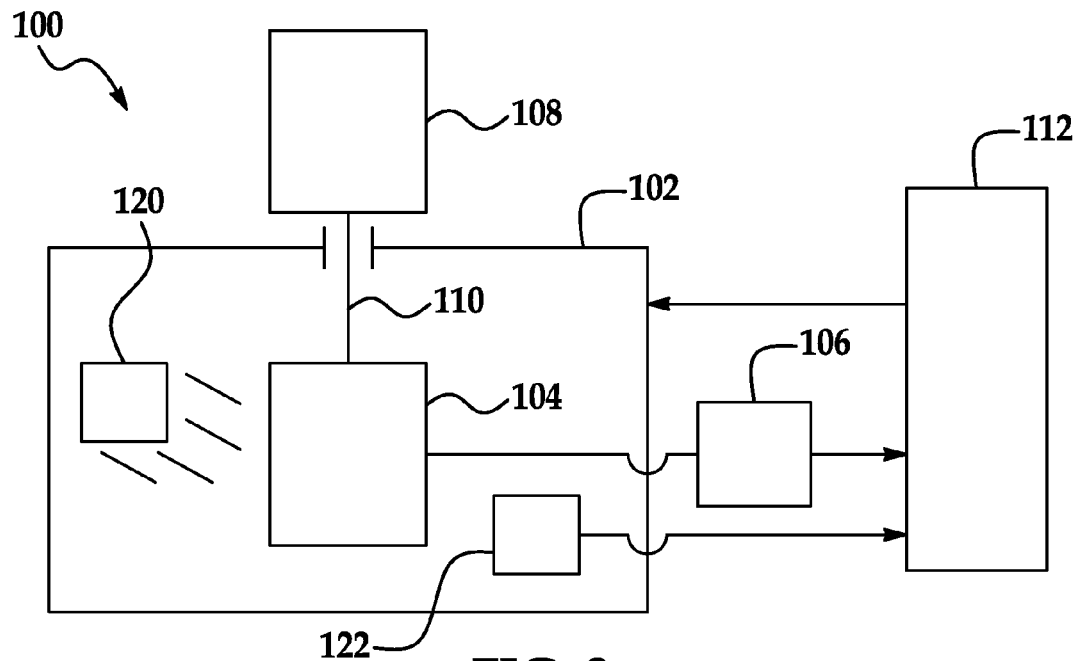
FIG. 3 is a schematic of an apparatus used to prepare catalyst with the processes as disclosed herein.

Also disclosed are embodiments of an apparatus for the rapid synthesis of catalyst by the methods disclosed herein. As shown in FIG. 3, the apparatus 100 can comprise a microwave radiation generator 102 with a reaction chamber 104 positioned relative to the microwave radiation generator 102 to receive microwave radiation. A temperature probe 106 is configured to detect a temperature within the reaction chamber 104. A reflux condenser 108 is in fluid communication 110 with the reaction chamber 104 and is positioned relative to the microwave radiation generator 102 to avoid microwave radiation of the reflux condenser 108. A controller 112 is configured to receive the temperature within the reaction chamber 104 from the temperature probe 106 and control production of microwave radiation by the microwave radiation generator 102 based on the temperature received from the temperature probe 106 to increase the temperature of the reaction chamber 104 at a controlled rate until a predetermined temperature is reached. The controller 112 is also configured to control production of microwave radiation by the microwave radiation generator 102 to maintain the temperature of the reaction chamber 104 at the predetermined temperature until the reduction and depositing are detected to be complete.

Figure 4:
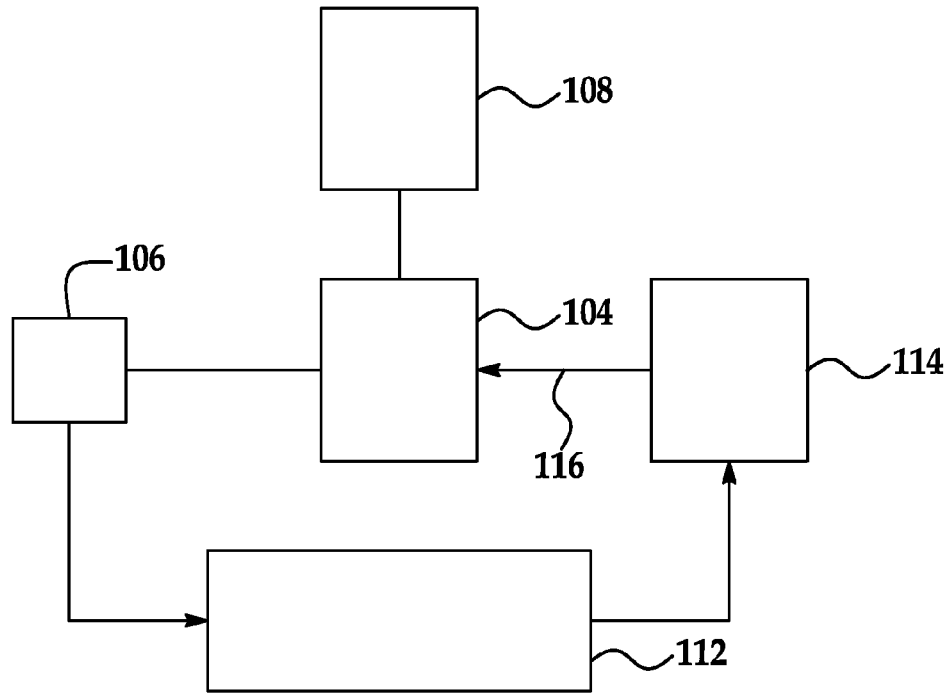
FIG. 4 is a schematic of another embodiment of an apparatus used to prepare catalyst with the processes as disclosed herein.

In FIG. 3, the microwave radiation generator 102 is illustrated as a microwave oven. FIG. 4 illustrates another aspect of the embodiment of FIG. 3. In FIG. 3, the microwave radiation generator is a microwave laser 114 and the reaction chamber 104 is positioned within a beam 116 of the microwave laser. The reflux condenser 108 is positioned outside of the beam 116 of the microwave laser 114.

As noted, the detection of the completion of the reduction and deposition can be done in a number of ways. FIG. 3 illustrates the use of a light emitter 120 and light detector 122 to detect when the solution turns from transparent to opaque. The light emitter 120 emits light through the reaction chamber 104 and the light detector 122 monitors the amount of light that passes through the reaction chamber 104 and sends the information to the controller 112. The controller 112 will request the microwave irradiation stop when the light detector 122 indicates that the solution is opaque. The light emitter 120 and light detector 122 can be used with any embodiment disclosed herein.

Figure 5A:
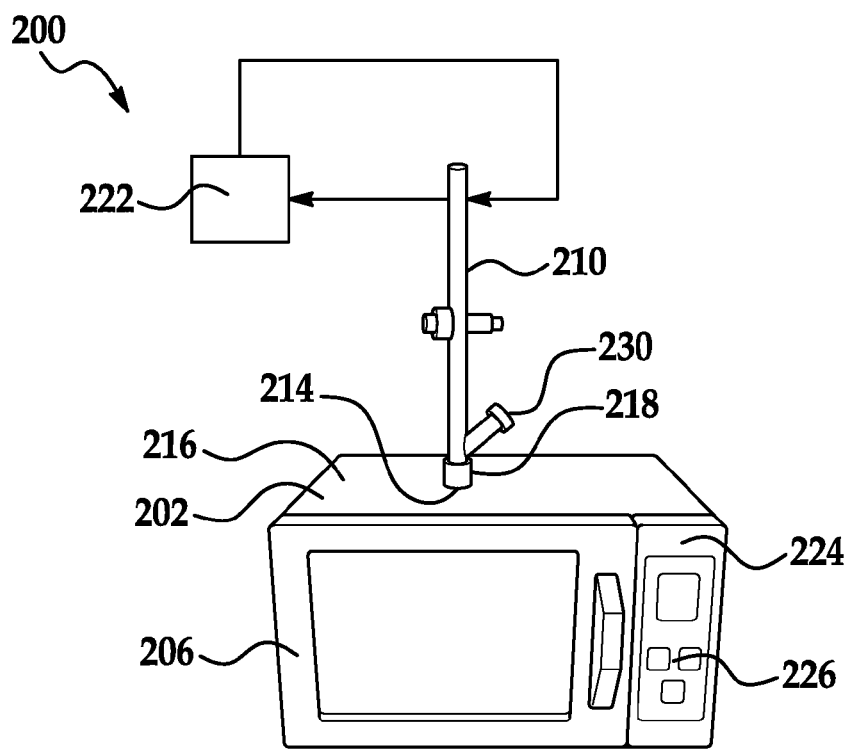
FIGS. 5A and 5B are detailed schematics of an embodiment of an apparatus as disclosed herein.
Figure 5B:
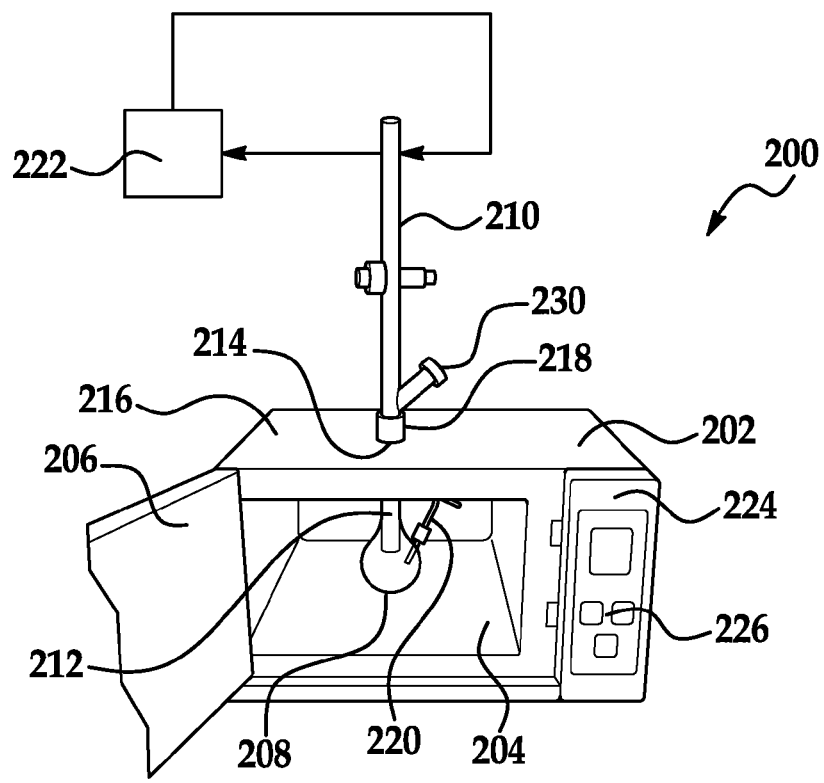

FIGS. 5A and B are detailed illustrations of an embodiment of an apparatus 200 for the rapid synthesis of catalyst by the methods disclosed herein. In this embodiment, the microwave radiation generator is a microwave oven 202. As a non-limiting example, an industrial microwave oven can be used having an output power of approximately 1000 microwave watts and an operating frequency of approximately 2.45 GHz. The microwave oven 202 has a cavity 204, which can have corrosion-resistant stainless steel walls. The microwave oven 202 provides even microwave radiation distribution for uniform heating with no or minimal hot spots. The cavity 204 can also have a powered exhaust fan to remove fumes, preventing any gas build-up in the cavity 204. FIG. 5A illustrates the cavity 204 enclosed by a door 206 of the microwave oven 202.

The reaction chamber 208 is positioned within the cavity 204 of the microwave oven 202. The reaction chamber 208 can be a reaction flask made from glass or other inert material. The reflux condenser 210 is positioned outside of the microwave oven 202 and is connected to the reaction chamber 208 with an adapter 212 extending through an aperture 214 in a wall 216 of the microwave oven 202. The adapter 212 can be sized to fit with a sealable engagement to a neck of the reaction chamber 208, for example. The adapter 212 is configured to prevent radiation leakage from the microwave oven 202, such as with seal 218 made of material such as Teflon®, for example. The reflux condenser 210 can be equipped with a liquid circulator 222 configured to control a temperature of liquid circulated through the reflux condenser 210.

The temperature probe 220 is configured to measure the temperature of the solution in the reaction chamber 208. The reaction chamber 208 can have a port sized and configured to receive the temperature probe 220. The microwave oven 202 can have a built-in microwave-safe temperature probe 220 containing a thermocouple embedded within a stainless steel tube, as a non-limiting example.

The temperature probe 220 provides the temperature of the solution in the reaction chamber 208 to a controller 224, such as a central processing unit. The controller 224 can be a separate unit in communication with the microwave oven 202 or can be integrated within the microwave oven 202. The controller 224 interfaces with the temperature probe 220 to monitor and control the solution temperature. Heating is controlled by feedback from the temperature probe 220 of the solution temperature to the controller 224. The controller 224 is programmed to increase the temperature of the solution in the reaction chamber 208 at a controlled rate between about 8° C./minute to about 12° C./minute until a predetermined temperature is reached at which the solution will soak. The predetermined temperature is below about 300° C., and particularly between about 180° C. and 200° C. When the predetermined temperature is reached, the controller 224 compares the solution temperature to the predetermined temperature. If the sample temperature is too low, the controller 224 calls for microwave radiation to maintain the solution at the predetermined temperature. If the solution temperature is too high, the controller 224 ceases microwave radiation to maintain the solution at the predetermined temperature. These steps are repeated by the controller 224 until the reduction and depositing are detected to be complete.

The controller 224 can have a control panel 226 configured to receive input from the user, such as the rate at which the temperature should be increased, the predetermined temperature and the predetermined period of time. The controller 224 can be preprogrammed with options such that the user will use the control panel 226 to select the required parameters. The control panel 226 can display any information desirable, such as current temperature of the solution, target predetermined temperature, time period lapsed, etc.

The apparatus 200 can also include a sealable portal 230 configured to allow introduction of material to the reaction chamber 208 during irradiation. As non-limiting examples, the adapter 212 can have a second portal extending in a Y-shape that can be separately sealed and through which material can be added, or the reaction flask 208 itself can have a second portal extending there from and through a second aperture within the microwave oven 202 wall 216.

Figure 6:
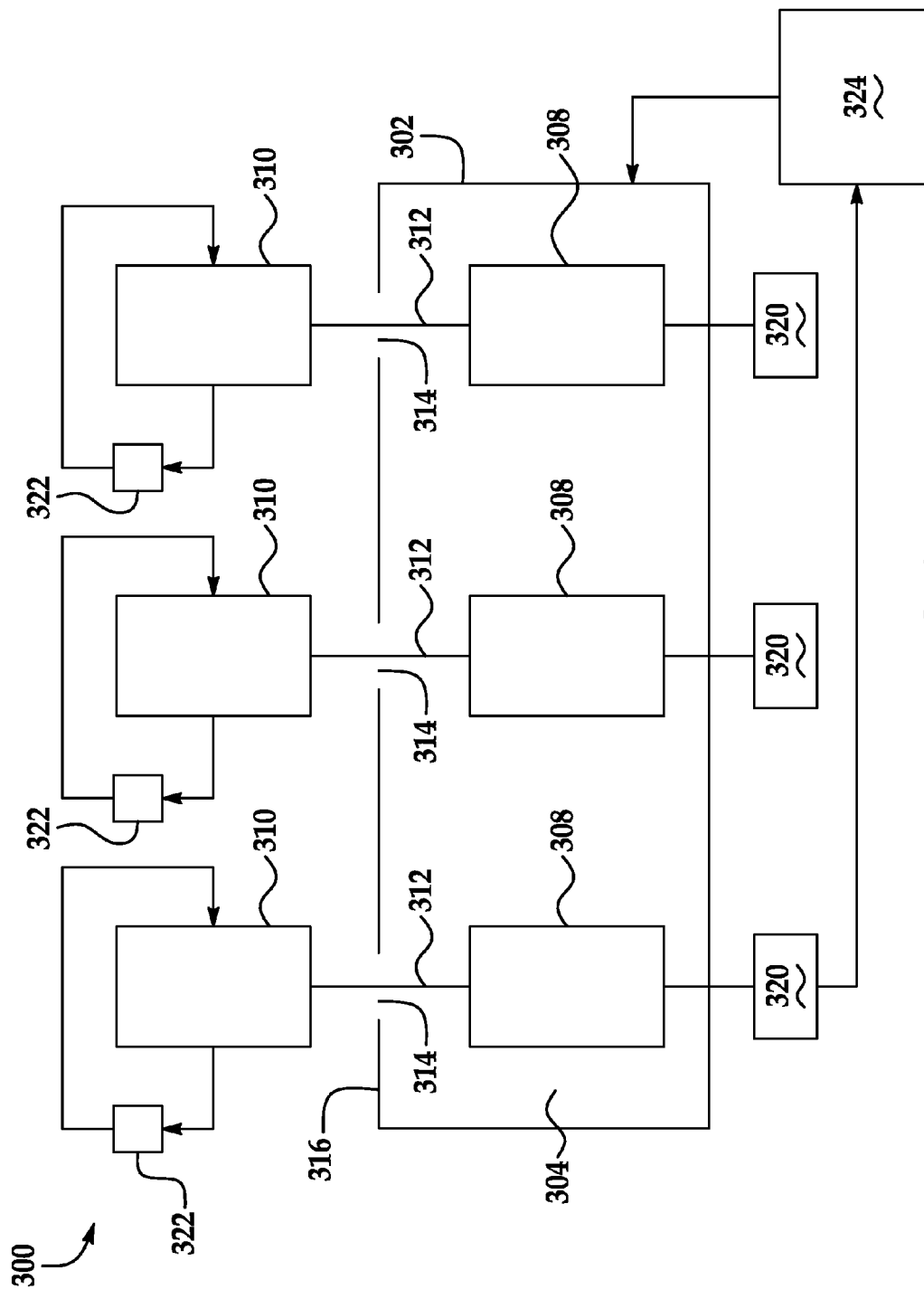
FIG. 6 is a schematic of another embodiment of an apparatus used to prepare catalyst with the processes as disclosed herein.

FIG. 6 is another embodiment of an apparatus 300 for the rapid synthesis of a plurality of catalysts by the methods disclosed herein. In this embodiment, the apparatus 100, 200 as disclosed herein can be altered so that a plurality of the same catalyst can be made simultaneously or a plurality of different types of catalyst can be made simultaneously. FIG. 6 is a schematic of FIG. 3 with additional components described herein.

A plurality of reaction chambers 308 are positioned within the cavity 304 of the microwave oven 302. The three reaction chambers 308 shown in FIG. 6 are provided as an example and is not meant to limit the number of reaction chambers 308. Reflux condensers 310 are positioned outside of the microwave oven 302 and are each connected to a respective reaction chamber 308 with an adapter 312 extending through respective apertures 314 in a wall 316 of the microwave oven 302. Each reflux condenser 310 can be equipped with a liquid circulator 322 configured to control a temperature of liquid circulated through the reflux condenser 310.

Each reaction chamber 308 has a temperature probe 320 configured to measure the temperature of the solution in the associated reaction chamber 308. Each temperature probe 320 provides the temperature of the solution in its associated reaction chamber 308 to a controller 324, which interfaces with the temperature probes 320 to individually monitor and control the solution temperature in each reaction chamber 308. Heating of each reaction chamber 308 is controlled by feedback from its temperature probe 320 of the solution temperature to the controller 324. The controller 324 is programmed to increase the temperature of the solution in each reaction chamber 308 at a controlled rate, which can be the same for each reaction chamber 308 or different based on user selection. When the predetermined temperature is reached for the individual reaction chamber 308, the controller 324 compares the solution temperature to the predetermined temperature. If the sample temperature is too low, the controller 324 calls for microwave radiation to maintain the solution at the predetermined temperature. If the solution temperature is too high, the controller 324 ceases microwave radiation to maintain the solution at the predetermined temperature. These steps are repeated by the controller 324 until the reduction and depositing are detected to be complete.

Unlike traditional catalyst preparation apparatus methods, the apparatus and methods disclosed herein provide uniform and even heating of the solution, rapid heating of the solution leading to shortened reaction times, energy-efficiency due to the shortened reaction times and shortened times required to heat, and rapid, one-pot synthesis of novel fuel cell catalysts.

Also disclosed herein are catalysts formed with the rapid synthesis processes disclosed herein. The catalyst can be formed using the apparatus disclosed herein.

For example, to synthesize a catalyst having 50 wt % platinum on carbon support, 250µL of a 1.0M $H_2PtCl_6$ precious metal precursor dissolved in ethylene glycol was mixed with 50 mg Ketjen Black® and 25 mL ethylene glycol. The solution was sonicated for thirty minutes in a reaction chamber to form a homogeneous solution. The reaction chamber was connected to the adapter of the reflux condenser in a microwave oven and heated at a controlled rate of 10° C./minute. The solution was heated to a predetermined temperature of 190° C. and was kept at that temperature for three minutes. The resulting catalyst was then allowed to cool to room temperature and subsequently washed five times with deionized water to remove chloride ions and other impurities.

Figure 7:
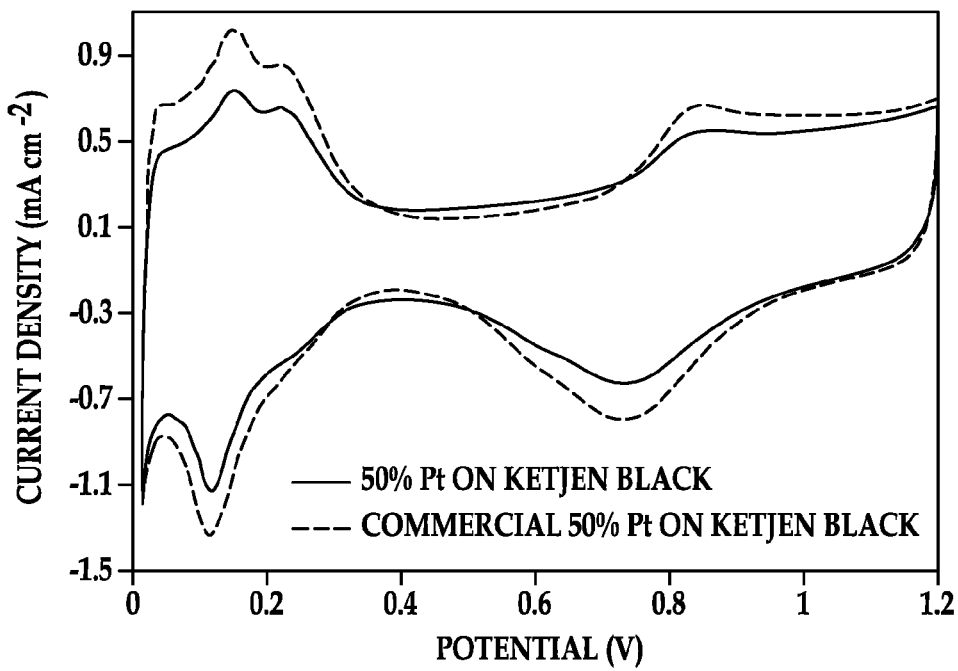
FIG. 7 is a cyclic voltammogram comparing a commercial catalyst to a catalyst as disclosed herein.

FIG. 7 is a cyclic voltammogram (CV) comparing the catalyst produced in the example above with commercially purchased catalyst having 50 wt % Pt on Ketjen Black® support. This CV comparison confirms the viability of the disclosed processes and apparatus in making commercially acceptable catalyst.

Another embodiment of a catalyst disclosed herein is an ultra-low loading catalyst prepared by processes disclosed herein.

A non-limiting example of an ultralow loading catalysts disclosed herein comprises support particles of a non-precious group metal (non-PGM) catalyst and precious metal particles supported on the support particles. The non-PGM catalyst is used for the dual functions of support and active catalyst sites. By depositing a small amount of precious metal nanoparticles on non-PGM catalyst support, the cost of the resulting catalyst is reduced while the catalytic activity or performance is increased. The catalytic activity is improved by the addition of single active sites provided by the precious metal nanoparticles, providing more active sites for fuel cell oxygen reduction reaction while keeping increases in volume and price minimal. The ultralow loading catalyst is a non-limiting example and other combinations of the precious metal precursor and catalyst substrate disclosed herein and known to those skilled in the art can be used.

The precious metal nanoparticles have a diameter in the range of two to ten nanometers, or more particularly two to four nanometers. Although the smallest practicable nanoparticles are desired, nanoparticles of precious metal less than 2 nanometers tend to be unstable with regard to agglomeration.

The processes disclosed herein result in an ultralow loading catalyst with uniformly distributed precious metal nanoparticles on a surface of the catalyst substrate. The ultralow loading catalyst made by the processes herein has a precious metal loading of less than fifteen weight percent. Various precious metal weight percent loaded catalysts can be synthesized, with the minimum and maximum precious metal loading dictated by the structure of the particles used to prepare the ultralow loading catalyst. However, ultralow loading catalyst disclosed herein has been synthesized with a precious metal loading of less than five weight percent.

An example of an ultralow loading catalyst as disclosed herein having five weight percent platinum on a non-PGM catalyst is prepared as follows. 5.25 mg $H_2PtCl_6$, a platinum precursor, was mixed with 47.5 mg non-PGM catalyst as the catalyst substrate in 25 mL ethylene glycol. The solution was sonicated for thirty minutes to form homogeneous slurry in a reaction chamber. The reaction chamber was transferred to a microwave oven and attached to the reflux condenser and heated at a controlled ramp rate of 10° C./minute to a predetermined temperature of 190° C. The solution was kept at 190° C. for a predetermined time of three minutes. The resulting catalyst was then allowed to cool to room temperature and subsequently washed five times with deionized water to remove chloride ions and other impurities.

Figure 8:
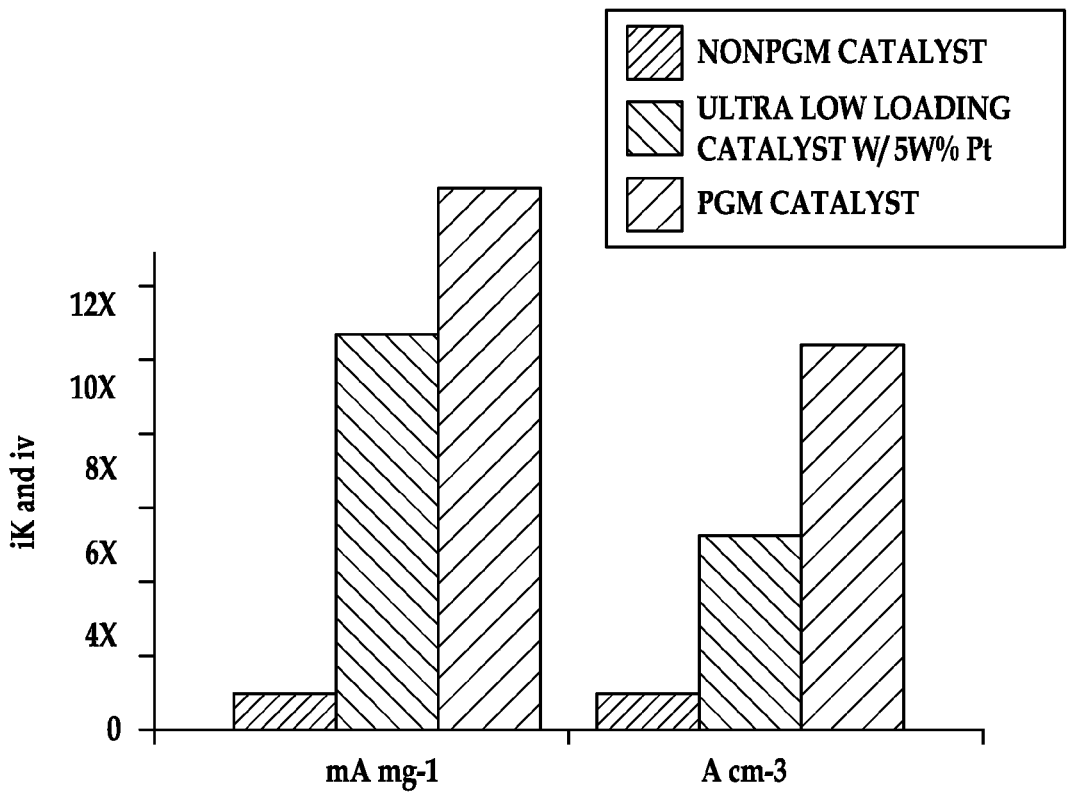
FIG. 8 is a graphic schematic comparing kinetic currents measured at 0.8V and normalized for loading (mA/mg) and volumetric activities ($A/cm^3$) of PGM catalyst, non-PGM catalyst and the ultralow loading catalyst as disclosed herein.

Two metrics, kinetic currents measured at 0.8V and normalized for loading (mA/mg) and volumetric activities (A/cm$^3$), are used to compare the activity of the ultralow loading catalyst with non-PGM catalyst alone. As shown in FIG. 8, the ultralow loading catalyst having a platinum presence on non-PGM catalyst support exhibits higher kinetic current and volumetric activity than a non-PGM catalyst.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of preparing catalyst comprising:
    forming a homogenous solution comprising a precious metal precursor and a catalyst substrate;
    reducing the precious metal precursor to precious metal nanoparticles;
    depositing the precious metal nanoparticles onto the catalyst substrate to form catalyst particles, wherein reducing and depositing comprise:
        controlling a rate of increase in temperature of the solution with microwave irradiation until the solution is at a predetermined temperature by, in a continuous loop, detecting a temperature of the solution with a temperature probe and adjusting the microwave irradiation, based on the temperature of the solution detected by the temperature probe, so that the temperature of the solution rises at the rate of increase until the predetermined temperature is reached; and
        maintaining the solution at the predetermined temperature with microwave irradiation;
    detecting completion of the reduction and deposition; and
    ceasing microwave irradiation upon detection.

2. The method of claim 1, wherein the rate of increase is between 8° C/minute to 12° C/minute.

3. The method of claim 1, wherein the predetermined temperature is 300° C. or less.

4. A method of preparing catalyst comprising:
    forming a homogenous solution comprising a precious metal precursor and a catalyst substrate;
    reducing the precious metal precursor to precious metal nanoparticles;
    depositing the precious metal nanoparticles onto the catalyst substrate to form catalyst particles, wherein reducing and depositing comprise:
        controlling a rate of increase in temperature of the solution with microwave irradiation until the solution is at a predetermined temperature;
        maintaining the solution at the predetermined temperature with microwave irradiation;
    detecting completion of the reduction and deposition; and
    ceasing microwave irradiation upon detection, wherein maintaining the solution at the predetermined temperature comprises, in a continuous loop:
        detecting a temperature of the solution with a temperature probe;
        adjusting the microwave irradiation, based on the temperature of the solution detected by the temperature probe, to maintain the solution at predetermined temperature.

5. The method of claim 1 further comprising adding stabilizer to the solution during reduction and deposition.

6. The method of claim 1 further comprising adding a second, stronger reducing agent to the solution during reduction and deposition.

7. The method of claim 1 further comprising adding one or more additional precious metal or transition metal precursors to the solution during reduction and deposition to form alloys or core-shells.

8. The method of claim 1, wherein detecting completion of deposition comprises:
    emitting light through the solution; and
    measuring an amount of light emitted through the solution, wherein completion is determined when a predetermined amount of light is measured.

9. The method of claim 8, wherein the predetermined amount of light is zero.

10. The method of claim 1 further comprising:
    cooling the catalyst particles; and
    washing the catalyst particles to remove impurities.

11. A method of preparing an ultra-low loading catalyst comprising:
    forming a homogenous solution comprising a precious metal precursor and a catalyst substrate;
    reducing the precious metal precursor to precious metal nanoparticles;
    depositing the precious metal nanoparticles onto the catalyst substrate to form catalyst particles, wherein reducing and depositing comprise:
        detecting a temperature of the solution with a temperature probe;

adjusting microwave irradiation of the solution, based on the temperature detected by the temperature probe, so that the temperature of the solution rises at a rate of increase until a predetermined temperature is reached, the rate of increase selected from a range of 8° C/minute to 12° C/minute; and adjusting the microwave irradiation, based on the temperature of the solution detected by the temperature probe, to maintain the solution at predetermined temperature, wherein the predetermined temperature is 300° C. or less;

detecting completion of the reduction and deposition; and ceasing microwave irradiation upon detection.

12. The method of claim 11, wherein the precious metal precursor is a platinum precursor and the catalyst substrate is a non-precious metal catalyst material and the solvent, the homogenous solution further comprising a reducing agent and a stabilizer.

13. The method of claim 12, wherein the ultra-low loading catalyst comprises less than fifteen weight percent platinum.

14. The method of claim 11 further comprising adding additional stabilizer to the solution during reduction and deposition.

15. The method of claim 11 further comprising adding one or more additional precious metal or transition metal precursors to the solution during reduction and deposition to form alloys or core-shells.

16. The method of claim 11, wherein detecting completion of deposition comprises:
emitting light through the solution; and
measuring an amount of light emitted through the solution, wherein completion is determined when a predetermined amount of light is measured.

17. The method of claim 16, wherein the predetermined amount of light is zero.

18. The method of claim 11 further comprising:
cooling the catalyst particles; and
washing the catalyst particles to remove impurities.

* * * * *